(12) United States Patent
Malik et al.

(10) Patent No.: US 6,373,722 B1
(45) Date of Patent: Apr. 16, 2002

(54) POWER SUPPLY SYSTEM FOR PROVIDING AN AUXILIARY OUTPUT VOLTAGE

(75) Inventors: Randhir S. Malik, Wake; Eino A. Lindfors, Durham, both of NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/588,269

(22) Filed: Jun. 5, 2000

(51) Int. Cl.⁷ .............................................. H02M 3/335
(52) U.S. Cl. .............................. 363/16; 363/20; 363/89
(58) Field of Search .............................. 363/16–26, 34, 363/81, 82, 89, 125, 126, 127

(56) References Cited

U.S. PATENT DOCUMENTS

| | | | | |
|---|---|---|---|---|
| 5,119,284 A | * | 6/1992 | Fisher et al. | 363/34 X |
| 5,122,945 A | * | 6/1992 | Marawi | 363/21 |
| 5,619,403 A | | 4/1997 | Ishikawa et al. | 363/21 |
| 5,636,108 A | | 6/1997 | Taurand | 363/20 |
| 5,754,415 A | | 5/1998 | Blackmon | 363/21 |
| 5,771,160 A | | 6/1998 | Seong | 363/20 |
| 5,886,880 A | | 3/1999 | Hisanaga | 363/20 |
| 6,130,828 A | * | 10/2000 | Rozman | 363/21 |
| 6,169,667 B1 | * | 1/2001 | Liu | 363/24 |

* cited by examiner

Primary Examiner—Jessica Han
(74) Attorney, Agent, or Firm—Sawyer Law Group, LLP

(57) ABSTRACT

A power supply system is disclosed. The circuit comprises a main power supply portion, the main power supply portion including a transformer, and an auxiliary power supply portion wherein the auxiliary power supply portion is coupled to the main power supply portion via the transformer. Through the use of the power supply system in accordance with the present invention, the auxiliary output voltage is generated by the main power supply. Therefore, the present invention provides the auxiliary output voltage supply by using the same pulse width modulator and switching devices as used by the main power supply. The use of a power supply system in accordance with the present invention thereby eliminates the need for the components required to maintain the auxiliary output voltage.

14 Claims, 2 Drawing Sheets

POWER SUPPLY SYSTEM FOR PROVIDING AN AUXILIARY OUTPUT VOLTAGE

FIELD OF THE INVENTION

The present invention relates generally to processing systems and specifically to a power supply system for a processing system that provides an auxiliary output voltage.

BACKGROUND OF THE INVENTION

Typically a power supply in a desktop computer requires the maintenance of an auxiliary output voltage for the operation of the service processor and for internal house keeping. This auxiliary output voltage is generally a separate small power supply within a main power supply and is used to provide continuous current even when other power outputs are turned off. However, this small power supply adds extra cost and instrumentation to the overall system.

FIG. 1 depicts a conventional power supply system. The area enclosed by the dashed line contains a flyback auxiliary power supply 10 of the power supply system. The remaining portion represents the main power supply 11. The main power supply 11 includes a first capacitor 26 coupled to a transformer 22. The supply 11 also includes a transistor 36 coupled to the transformer 22, diodes 20, 28, 30, an inductor 32 coupled to diode 28, and a second capacitor 34 coupled to the inductor 32. The flyback auxiliary power supply 10 includes a transformer 12. The transistor 14 is coupled to the transformer 12 and a pulse width modulator 15. The transformer 12 is coupled to a diode 16. The diode 16 is coupled to a capacitor 18.

Because the flyback auxiliary power supply 10 is segregated from the main power supply system, it requires a separate transformer 12, a separate transistor 14, and a separate pulse width modulator 15 which increases the cost and size of the power supply system.

Accordingly, what is needed is a circuit that decreases the cost and size of the power supply system. The circuit should be simple and adaptable to existing technology. The present invention addresses such a need.

SUMMARY OF THE INVENTION

A power supply system is disclosed. The system comprises a main power supply portion, the main power portion including a transformer, and an auxiliary power portion wherein the auxiliary power portion is coupled to the main power portion via the transformer.

Through the use of the power supply system in accordance with the present invention, the auxiliary output voltage is generated by the main power portion. Therefore, a circuit in accordance with the present invention provides the auxiliary output voltage by using the same pulse width modulator and switching devices used by the main power portion. The use of a power supply system in accordance with the present invention thereby eliminates the need for the components required to maintain the auxiliary output voltage. Accordingly, system space can be saved and there is also a reduction in manufacturing costs.

DETAILED DESCRIPTION

The present invention relates to a power supply system. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

The present invention is disclosed in the context of a preferred embodiment. The present invention provides for a power supply system that also provides an auxiliary output voltage in accordance with the present invention, the auxiliary output voltage portion uses the same switching devices that are used by the main power portion. The use of a circuit in accordance with the present invention thereby eliminates the need for the separate switching components required to maintain the auxiliary output voltage. This saves space and reduces manufacturing costs.

Figure 1:
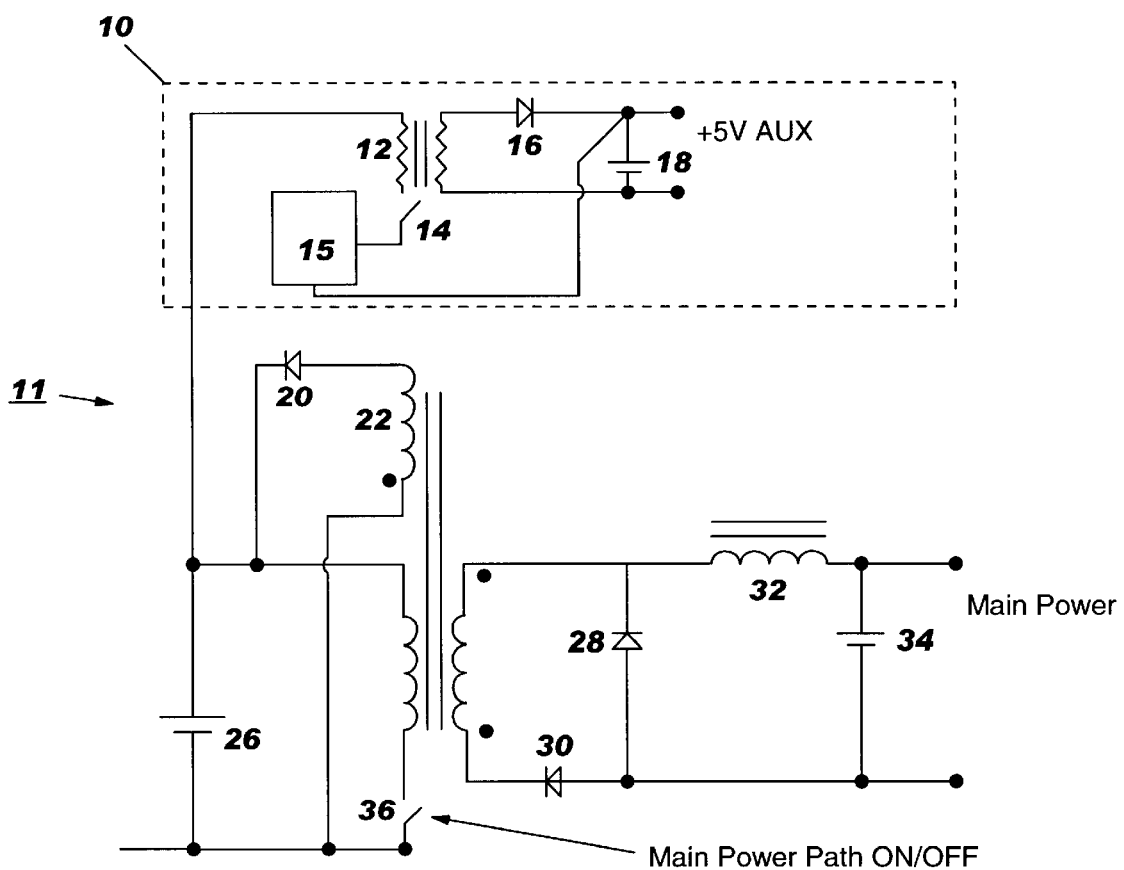
FIG. 1 depicts a conventional power supply system.
Figure 2:
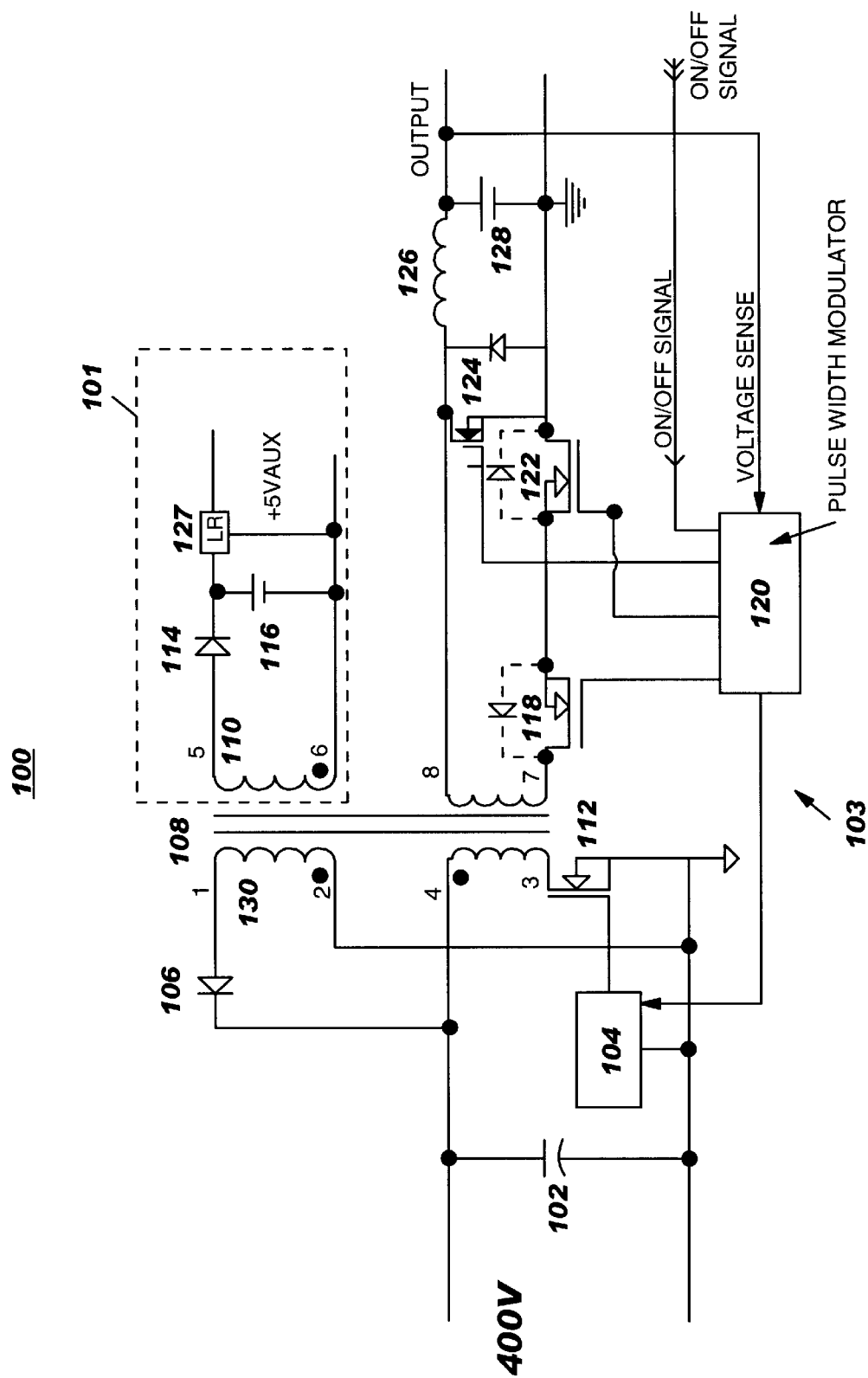
FIG. 2 shows a diagram of the circuit in accordance with the present invention.

FIG. 2 shows a diagram of the power supply system 100 in accordance with the present invention. The circuit 100 includes an auxiliary power portion 101 and a main power portion 103. The remaining portion is the main power portion 103. The main power portion 103 includes a first capacitor 102 coupled to drivers 104. The main power portion 103 also includes a transistor switch 112 coupled to drivers 104. The main power portion 103 also includes a transformer 108 coupled to the transistor switch 112 and a first diode 106 coupled to transformer 108. The main power portion 103 includes a pulse width modulator 120 coupled to a second switch 118. The second switch 118 is coupled to the transformer 108 and a third switch 122. The third switch 122 is coupled to a fourth switch 124. The fourth switch 124 is coupled to an inductor 126. A second capacitor 128 is coupled to the inductor 126. The auxiliary power portion 101 includes a winding 110 of transformer 108. The auxiliary power portion also includes a diode 114 coupled to the winding 110. Finally the auxiliary portion includes a capacitor 116 coupled to the diode 114. The 5V auxiliary output is provided by a linear regulator 127. The pulse width modulator (PWM) 120 is operational and transistor 112 is switching ON/OFF signal is in OFF state.

In a preferred embodiment of the present invention, switches 112, 118, 122, and 124 are MOSFET transistors. Diodes drawn with dotted lines are internal body diodes in the MOSFET structure. However, one of ordinary skill in the art will readily recognize that a variety of switches could be utilized while remaining within the spirit and scope of the present invention.

The winding 110 is used to provide an isolated auxiliary output across capacitor 116 at all times irrespective of the state of ON/OFF 112 switch. During OFF state of 112 switch, no output voltage except the auxiliary output voltage is available from the power supply. As a result, the auxiliary power supply portion 101 uses the same switching devices and magnetic device that is used by the main power portion. Consequently, the need for separate switching devices is eliminated.

The operation of the power supply system in accordance with the present invention will now be described. Referring to FIG. 2, when transistor 112 is turned on, node 5 of winding 110 is negative with respect to node 6 of the winding 110. Therefore, the first diode 106 is reverse biased and no current flows through the second diode 114. At the same time transistor 112 is turned on, transistor 118 turns on and the current will flow from winding (7_8) to the output through inductor 126 and transistors 118 and 122 provided transistor 122 is turned on by the ON/OFF signal. If the ON/OFF signal is in the off state, transistor 122 is off and the main power will not be provided.

When transistor 112 is turned off, first and second diodes 106 and 114 are forward biased and magnetizing energy in the transformer 108 is used to charge capacitor 116 and provide 5V auxiliary output through linear regulator 127. This auxiliary output will stay within regulation because it is provided by a pre-regulated voltage on the primary side and post-regulated by linear regulated 127.

The auxiliary power is developed in the following manner. When transistor 112 turns off, magnetizing energy stored in transformer 108 is delivered to capacitor 116 through diode 114. If there is no load current in the 5V auxiliary output, the input voltage (voltage developed across 116) to the linear regulator will be clamped to:

$$V_{116} = \frac{\text{Number of turns on winding 110}}{\text{Number of turns on winding 128}} \times 40 \text{ and}$$

$$\leq \text{Maximum input voltage of linear regulator 127.}$$

The magnetizing energy of transformer 108 is selected such that the voltage across capacitor 116=5V auxiliary output (Vin−Vout) min for maximum auxiliary power.

At the same time transistor 112 is turned off, transistor 118 is turned off, and transistor 124 is turned on to allow the current to flow through the inductor 126 to provide output power to the load. The maximum voltage developed across 116 will be clamped to the regulated voltage on winding 110 of transformer 108.

Accordingly, with the insertion of transistor 124 in the lower RMS current path, the +12V main power is turned on and off via the ON/OFF signal while the +5V auxiliary output is derived from the reset winding 110 of the transformer 108 without using separate switching components for the auxiliary power supply portion.

Although the preferred embodiment of the present invention discloses the insertion of a transistor in the lower current path to implement the circuit in accordance with the present invention, one of ordinary skill in the art will readily recognize that the transistor could be inserted in the high current path while remaining within the spirit and scope of the present invention.

Through the use of the power supply system in accordance with the present invention, the auxiliary output voltage is generated by the main power supply. Therefore, the present invention provides the auxiliary output voltage supply by using the same pulse width modulator and switching devices used by the main power supply. The use of a power supply system in accordance with the present invention thereby eliminates the need for the components required to maintain the auxiliary output voltage. Accordingly, system space can be saved while at the same time reducing manufacturing costs.

Although the present invention has been described in accordance with the embodiments shown, one of ordinary skill in the art will readily recognize that there could be variations to the embodiments and those variations would be within the spirit and scope of the present invention. Accordingly, many modifications may be made by one or ordinary skill in the art without departing from the spirit and scope of the appended claims.

What is claimed is:

1. A power supply system comprising:
    a main power portion, the main power portion comprising:
        a transformer;
        a driver portion coupled to the transformer;
        a first transistor coupled to the driver portion for controlling an input voltage to the main power portion;
        at least one transistor coupled to the transformer for providing a switched main power output;
        a pulse width modulator coupled to the at least one transistor; and
        an inductor coupled to the at least one transistor; and
    an auxiliary power portion, the auxiliary power portion comprising a diode and capacitor coupled to a linear regulator, wherein the auxiliary power portion is coupled to the transformer via a winding and supplies a continuous output voltage by utilizing magnetizing energy stored in the transformer when the first transistor is in an OFF state.

2. A power supply system comprising:
    a main power portion, the main power portion including a transformer, a first transistor coupled to the transformer for controlling an input voltage to the main power portion, and at least one transistor coupled to the transformer for providing a switched main power output; and
    an auxiliary power portion coupled to the main power portion via the transformer, wherein the auxiliary power portion supplies a continuous output voltage by utilizing magnetizing energy stored in the transformer when the first transistor is in an OFF state, and includes a linear regulator for controlling the continuous output voltage.

3. The circuit of claim 1 wherein the main power portion further comprises a pulse width modulator coupled to the at least one transistor.

4. The circuit of claim 3 wherein the main power portion further comprises an inductor coupled to the at least one transistor.

5. The circuit of claim 1 wherein the auxiliary power portion further comprises:
    a diode coupled to the linear regulator; and
    a capacitor coupled to the diode wherein the auxiliary power portion is coupled to the transformer via a winding.

6. A power supply system comprising:
    a transformer;
    a switched output coupled to the transformer for providing a main voltage; and
    a first switch coupled to the transformer for providing an auxiliary voltage, wherein the switch includes a linear regulator for controlling the auxiliary voltage, and wherein the auxiliary voltage is maintained when the first switch is in an OFF state by utilizing magnetizing energy stored in the transformer.

7. The system of claim 6 wherein the switched output comprises:
    a driver portion; and
    at least one switching system coupled to the driver portion and the transformer.

8. The system of claim 7 wherein the switching system comprises:
    at least one transistor coupled to the driver portion and the transformer; and
    at least one diode coupled to the transformer.

9. The system of claim 7 wherein the switched output further comprises a pulse width modulator coupled to the at least one switching system.

10. The system of claim 9 wherein the switched output further comprises an inductor coupled to the at least one transistor.

11. A power supply system comprising:
- a main power portion, the main power portion comprising:
  - a transformer;
  - a driver portion coupled to the transformer;
  - a first transistor coupled to the driver portion for controlling an input voltage to the main power portion; and
  - at least one transistor coupled to the transformer for providing a switched main power output; and
- an auxiliary power portion coupled to the transformer via a winding, wherein the auxiliary power portion supplies a continuous output voltage by utilizing magnetizing energy stored in the transformer when the first transistor is in an OFF state, and includes a linear regulator for controlling the continuous output voltage.

12. The circuit of claim 11 wherein the main power portion further comprises a pulse width modulator coupled to the at least one transistor.

13. The circuit of claim 12 wherein the main power portion further comprises an inductor coupled to the at least one transistor.

14. The circuit of claim 11 wherein the auxiliary power portion further comprises a diode and a capacitor coupled to the linear regulator.

* * * * *